US009080057B2

(12) United States Patent
Backer et al.

(10) Patent No.: US 9,080,057 B2
(45) Date of Patent: Jul. 14, 2015

(54) TREATMENT OF FILLER WITH SILANE

(71) Applicant: Dow Corning Corporation, Midland, MI (US)

(72) Inventors: Michael Wolfgang Backer, Mainz (DE); Thomas Chaussee, Fontaines Saint Martin (FR); Olivier Debever, Lembeek (BE); Francois De Buyl, Hoeilaart (BE)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/362,644

(22) PCT Filed: Dec. 7, 2012

(86) PCT No.: PCT/EP2012/074735
§ 371 (c)(1),
(2) Date: Jun. 4, 2014

(87) PCT Pub. No.: WO2013/083748
PCT Pub. Date: Jun. 13, 2013

(65) Prior Publication Data
US 2014/0350152 A1 Nov. 27, 2014

(30) Foreign Application Priority Data

Dec. 8, 2011 (GB) .................................. 1121128.1

(51) Int. Cl.
| C09C 1/56 | (2006.01) |
| C08K 9/06 | (2006.01) |
| C09C 1/44 | (2006.01) |
| C01B 31/02 | (2006.01) |
| C01B 31/04 | (2006.01) |
| C09C 1/48 | (2006.01) |
| B82Y 30/00 | (2011.01) |
| B82Y 40/00 | (2011.01) |

(52) U.S. Cl.
CPC . C09C 1/56 (2013.01); B82Y 30/00 (2013.01); B82Y 40/00 (2013.01); C01B 31/0213 (2013.01); C01B 31/0273 (2013.01); C01B 31/0484 (2013.01); C08K 9/06 (2013.01); C09C 1/44 (2013.01); C09C 1/48 (2013.01); C01P 2002/88 (2013.01); C01P 2004/13 (2013.01)

(58) Field of Classification Search
CPC ..................................... C09C 1/48; C09C 1/56
USPC .................. 524/188, 495; 423/428, 447.1
See application file for complete search history.

(56) References Cited

U.S. PATENT DOCUMENTS

| 2,853,488 A | 9/1958 | D'Amico et al. |
| 3,147,161 A | 9/1964 | Abere et al. |
| 3,169,122 A | 2/1965 | Hennes |
| 3,379,707 A | 4/1968 | Lund et al. |
| 3,408,198 A | 10/1968 | Reynolds et al. |
| 3,779,703 A | 12/1973 | Tesoro |
| 3,810,843 A | 5/1974 | Slusarczuk et al. |
| 3,855,241 A | 12/1974 | Wilkus et al. |
| 3,928,330 A | 12/1975 | Ramey et al. |
| 4,083,861 A | 4/1978 | Seiler et al. |
| 5,106,680 A | 4/1992 | King et al. |
| 5,369,143 A | 11/1994 | Kurimoto et al. |
| 5,821,277 A | 10/1998 | Hirayama et al. |
| 5,852,099 A | 12/1998 | Vanel |
| 6,494,946 B1 | 12/2002 | Belmont et al. |
| 6,794,428 B2 | 9/2004 | Burrington et al. |
| 6,806,339 B2 | 10/2004 | Cray et al. |
| 7,144,967 B2 | 12/2006 | Sakamoto et al. |
| 7,419,975 B2 | 9/2008 | Palermo et al. |
| 7,732,029 B1 | 6/2010 | Moorlag et al. |
| 7,833,404 B2 | 11/2010 | Matsuda et al. |
| 7,833,504 B2 | 11/2010 | Wong et al. |
| 7,847,117 B2 | 12/2010 | Merget |
| 7,981,966 B2 | 7/2011 | Kobayashi et al. |
| 8,140,294 B2 | 3/2012 | Ramey et al. |
| 8,202,944 B2 | 6/2012 | Suzuki et al. |
| 8,309,644 B1 * | 11/2012 | Huang .......................... 524/495 |
| 8,318,858 B2 | 11/2012 | Oshima |
| 8,476,375 B2 | 7/2013 | Backer et al. |
| 8,524,836 B2 | 9/2013 | Kavanagh et al. |
| 8,569,417 B2 | 10/2013 | Backer et al. |
| 2005/0234042 A1 | 10/2005 | Palermo et al. |
| 2010/0056713 A1 | 3/2010 | Oshima |
| 2010/0137499 A1 | 6/2010 | Moorlag et al. |
| 2011/0049056 A1 | 3/2011 | Wyndham et al. |

(Continued)

FOREIGN PATENT DOCUMENTS

| DE | 206848 | 2/1984 |
| GB | 1123303 | 8/1968 |

(Continued)

OTHER PUBLICATIONS

Matsuo et al: "Introduction of amino groups into the interlayer space of graphite oxide using 3-aminopropylethoxysilanes", Carbon, Elsevier, Oxford, GB, vol. 45, No. 7, Jun. 1, 2007, pp. 1384-1390.
Organometallics, vol. 13(9), 1994, (Muehleisen, Mathias; Tacke, Reinhold), pp. 3740-3742.
Russian Journal of Applied Chemistry; vol. 82, Issue 5, pp. 928-930; Journal 2009; by V. M. Farzaliev, M. T. Abbasova, A. A. Ashurova, G. B. Babaeva, N. P. Ladokhina and Ya. M. Kerimova.
The Russian Chemical Bulletin, vol. 44(2), 1995, pp. 374-375.
The Vanderbilt Rubber Handbook (1978), pp. 344 through 346.
Journal of Membrane Science, vol. 129(2), 1997, Barbiou, Mihai et al, pp. 197-207.
European Journal of Organic Chemistry, vol. 13, 2006, (Bianco, Alberto et al.), pp. 2934-2941.

(Continued)

Primary Examiner — John Uselding
(74) Attorney, Agent, or Firm — Matthew T. Fewkes

(57) ABSTRACT

This invention relates to the treatment of a carbon based filler with a hydrolysable silane to modify the surface of the filler. It also relates to a carbon based filler modified by treatment with a hydrolysable silane, and to polymer compositions containing such a modified carbon based filler.

20 Claims, No Drawings

(56) References Cited

U.S. PATENT DOCUMENTS

| | | |
|---|---|---|
| 2011/0146877 A1 | 6/2011 | Tanaka et al. |
| 2011/0172367 A1 | 7/2011 | Backer et al. |
| 2012/0059121 A1 | 3/2012 | Backer et al. |
| 2012/0065319 A1 | 3/2012 | Backer et al. |
| 2012/0270997 A1 | 10/2012 | Tanaka et al. |
| 2012/0277369 A1 | 11/2012 | Yoshida et al. |
| 2012/0330044 A1 | 12/2012 | Hou |
| 2013/0079464 A1 | 3/2013 | Nishioka et al. |

FOREIGN PATENT DOCUMENTS

| | | |
|---|---|---|
| GB | 1214451 | 12/1970 |
| GB | 1473335 | 5/1977 |
| HU | 180661 | 4/1983 |
| JP | 5543143 | 3/1980 |
| JP | 10095933 | 4/1998 |
| JP | 2001240706 | 9/2001 |
| JP | 2004085689 | 3/2004 |
| JP | 2004085775 | 3/2004 |
| JP | 2004109586 | 4/2004 |
| JP | 2005249897 | 9/2005 |
| JP | 2008163283 | 7/2008 |
| WO | 9429324 | 12/1994 |
| WO | 0170866 | 9/2001 |
| WO | 2011083050 | 7/2011 |

OTHER PUBLICATIONS

Gasparrini, F. et al., "Molecular recognition of p-tert-butylcalixarenes by surface-linked fullerenes C60 and C70", Tetrahedron, Elsevier Science Publishers, Amsterdam, NL, vol. 57, No. 32, Aug. 6, 2001, pp. 6997-7002.

Bianco et al., "Molecular recognition by a silica-bound fullerene derivative", J. Am. Chem. Soc. 1997, vol. 119, pp. 7550-7554.

Brunauer et al., Adsorption of Gases in Multimolecular Layers, Feb. 1938, pp. 309-319, vol. 60.

Chemische Berichte, vol. 120(4), 1987, Brueckmann, Ralf, et al., pp. 635-641.

* cited by examiner

TREATMENT OF FILLER WITH SILANE

CROSS REFERENCE TO RELATED APPLICATIONS

This application is a U.S. national stage filing under 35 U.S.C. §371 of PCT Application No. PCT/EP12/74735 filed on 7 Dec. 2012, currently pending, which claims the benefit of GB Patent Application No. 1121128.1 filed 8 Dec. 2011 under 35 U.S.C. §119 (a)-(d) and 35 U.S.C. §365(a). PCT Application No. PCT/EP12/74735 and GB Patent Application No. 1121128.1 are hereby incorporated by reference.

This invention relates to the treatment of a carbon based filler with a hydrolysable silane to modify the surface of the filler. It also relates to a carbon based filler modified by treatment with a hydrolysable silane, and to polymer compositions containing such a modified carbon based filler.

Examples of carbon based fillers include carbon black, which is used as a reinforcing filler in many polymer and rubber compositions, and carbon fibre, which is also used in reinforcing polymer compositions, particularly to give directional reinforcement. Further carbon based fillers include carbon nanotubes, fullerene, graphene, expandable graphene and expandable graphite. Carbon based fillers generally bond well to organic polymers, particularly hydrocarbon polymers, to give reinforcement, but bond less well to more polar polymers. Carbon based fillers like carbon fibres can be used for example to replace heavier glass fibres providing same strength enhancement at a lighter weight.

JP2004-085689 describes a dry imaging material containing a binder which is bridge crosslinked by a crosslinking agent which has a vinyl sulfonyl group, a trimethoxysilyl group, the isocyanate group, or an epoxy group.

JP2004-109586 and JP2004-085775 describe some hydrolysable silanes having tertiary amine group.

The Russian Chemical Bulletin, Volume 44(2), 1995, pages 374-375 describes N-methyl-N-alkoxymethylaminoethyl)dialkoxysilanes.

A process according to the invention for modifying the surface of a carbon based filler by treatment with a hydrolysable silane is characterised in that the hydrolysable silane is a silane of the formula

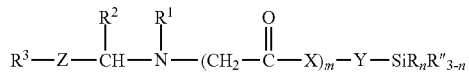

wherein each R represents a hydrolysable group; each R" represents a hydrocarbyl group having 1 to 8 carbon atoms; n=1 to 3; Y represents a divalent organic spacer linkage having 1 to 20 carbon atoms; X represents —O— or —NH—; m=0 or 1; $R^2$ represents hydrogen or a hydrocarbyl or substituted hydrocarbyl group having 1 to 8 carbon atoms; Z represents an oxygen or sulphur atom; $R^3$ represents a hydrocarbyl or substituted hydrocarbyl group having 1 to 20 carbon atoms; and $R^1$ represents a hydrocarbyl or substituted hydrocarbyl group having 1 to 20 carbon atoms other than a group of the formula $R^3$—Z—CH($R^2$)— as defined above.

The invention includes a carbon based filler modified by treatment with a hydrolysable silane of the formula $R^3$—Z—CH($R^2$)—N($R^1$)—(CH$_2$—C(=O)—X)$_m$—Y—SiR$_n$R"$_{3-n}$ as defined above.

The invention also includes the use of a hydrolysable silane of the formula

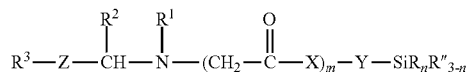

as defined above to modify the surface of a carbon based filler to introduce a reactive function on the surface of the filler.

The hydrolysable silanes of the formula

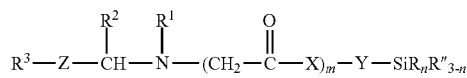

as defined above are capable of bonding strongly to materials containing carbon-to-carbon unsaturation. Carbon based fillers such as carbon fibre; carbon black, carbon nanotubes, fullerene, graphene, expandable graphene and expandable graphite generally contain some carbon-to-carbon unsaturation. The hydrolysable silanes of the formula

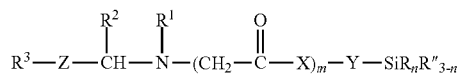

as defined above bond to such carbon based fillers, for example under the processing conditions used for producing filled polymer compositions. We believe that upon heating to the temperatures used in polymer compounding, the etheramine or thioetheramine moiety of the above hydrolysable silanes forms a very reactive species which reacts with the C=C bonds present in the carbon based fillers through [2+3] cycloaddition. The hydrolysable silanes of the formula

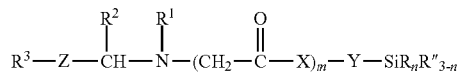

as defined above are also capable of bonding strongly through hydrolysis of the silane group to siloxane polymers, polymers containing alkoxysilane groups and polymers containing hydroxyl groups, thus forming effective coupling agents for carbon based fillers in such polymers.

Hydrolysable silanes in which n=3 may be preferred as having the maximum number of hydrolysable groups. Examples of groups of the formula R$_n$R'$_{3-n}$Si—Y— in which n=3 include trialkoxysilylalkyl groups such as triethoxysilylalkyl or trimethoxysilylalkyl groups, or triacetoxysilylalkyl groups. However hydrolysable silanes in which n=2 or n=1 are also useful coupling agents. In such hydrolysable silanes the group R' is a hydrocarbyl group having 1 to 8 carbon atoms. Preferred groups R' include alkyl groups having 1 to 4 carbon atoms such as methyl or ethyl, but R' can be an alkyl group having more carbon atoms such as hexyl or 2-ethylhexyl or can be an aryl group such as phenyl. Examples of groups of the formula R$_n$R'$_{3-n}$Si—Y— in which n=2 include diethoxymethylsilylalkyl, diethoxyethylsilylalkyl, dimethoxymethylsilylalkyl or diacetoxymethylsilylalkyl groups.

Hydrolysable silanes in which the group R is an ethoxy group are often preferred. The alcohol or acid RH may be released when the silane is hydrolysed, and ethanol is the most environmentally friendly compound among the alcohols and acids.

In the group of the formula —Y—SiR$_n$R"$_{3-n}$, Y represents a divalent organic spacer linkage having 1 to 20 carbon atoms. Preferably Y has 2 to 20 carbon atoms. Y can conveniently be an alkylene group, particularly an alkylene group having 2 to 6 carbon atoms. Preferred examples of linkage Y are —(CH$_2$)$_3$—, —(CH$_2$)$_4$—, and —CH$_2$CH(CH$_3$)CH$_2$— groups. The group of the formula R$_n$R'$_{3-n}$Si—Y can for example be a 3-(triethoxysilyl)propyl, 4-(triethoxysilyl)butyl, 2-methyl-3-(triethoxysilyl)propyl, 3-(trimethoxysilyl)propyl, 3-triacetoxysilylpropyl, 3-(diethoxymethylsilyl)propyl, 3-(diethoxyethylsilyl)propyl or 3-(diacetoxymethylsilyl)propyl group.

The hydrolysable silanes of the formula

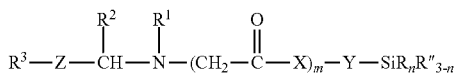

can be prepared by the reaction of a secondary aminoalkylsilane of the formula R$^1$—NH—(CH$_2$—C(O)—X)$_m$—Y—SiR$_n$R"$_{3-n}$ wherein each R represents a hydrolysable group; each R" represents a hydrocarbyl group having 1 to 8 carbon atoms; n=1 to 3; Y represents a divalent organic spacer linkage having 1 to 20 carbon atoms; X represents —O— or —NH—; m=0 or 1; and R$^1$ represents a hydrocarbyl or substituted hydrocarbyl group having 1 to 20 carbon atoms; with an aldehyde of the formula R$^2$—CHO wherein R$^2$ represents hydrogen or a hydrocarbyl or substituted hydrocarbyl group having 1 to 8 carbon atoms and an alcohol or thiol of the formula R$^3$ZH wherein Z represents an oxygen or sulphur atom; and R$^3$ represents a hydrocarbyl or substituted hydrocarbyl group having 1 to 20 carbon atoms.

In the secondary aminoalkylsilane which is reacted with an aldehyde and an alcohol or thiol, the group R$^1$ can for example represent a hydrocarbyl group having 1 to 8 carbon atoms. For example the group R$^1$ can be an alkyl group such as H(CH$_2$)$_{1-8}$, for example a methyl or ethyl group. The group R$^1$ can alternatively be an aryl or aralkyl group, for example a phenyl group or a benzyl group. When m=0, the secondary aminoalkylsilane can for example be CH$_3$—NH—(CH$_2$)$_3$—Si(OC$_2$H$_5$)$_3$. Alternatively when m=1, the secondary aminoalkylsilane can for example be CH$_3$—NH—CH$_2$—C(O)O—(CH$_2$)$_3$—Si(OC$_2$H$_5$)$_3$.

The aldehyde which is reacted with a secondary aminoalkylsilane and an alcohol or thiol has the formula R$^2$—CHO wherein R$^2$ represents hydrogen or a hydrocarbyl or substituted hydrocarbyl group having 1 to 8 carbon atoms. A preferred aldehyde is formaldehyde, wherein R$^2$ represents hydrogen. The formaldehyde can for example be added to the reaction in the form of paraformaldehyde. Alternative aldehydes include acetaldehyde and butyraldehyde.

In one preferred set of hydrolysable silanes of the formula

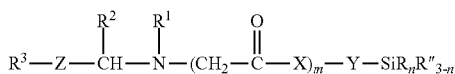

Z represents an oxygen atom and R$^3$ represents a hydrocarbyl group having 1 to 8 carbon atoms. Such silanes can be formed by reaction of an alcohol of the formula R$^3$OH with a secondary aminoalkylsilane and an aldehyde. Examples of suitable alcohols include ethanol, methanol, propanol, n-butanol, 2-methylpropanol, t-butanol, n-hexanol and 2-ethylhexanol.

The alcohol can act as both solvent and reagent in the reaction with the secondary aminoalkylsilane and aldehyde.

The most preferred alcohol is ethanol, i.e. R$^3$ is preferably ethyl. When the hydrolysable silane of the invention reacts with the C═C bonds present in the carbon based filler through [2+3] cycloaddition, an alcohol of the formula R$^3$OH may be liberated. Ethanol is preferred as the most environmentally friendly alcohol.

Examples of this type of hydrolysable silane include:
C$_2$H$_5$—O—CH$_2$—N(CH$_3$)—(CH$_2$)$_3$—Si(OC$_2$H$_5$)$_3$
C$_2$H$_5$—O—CH$_2$—N(C6H5)-(CH2)3-Si(OC2H5)3
C2H5-O—CH2-N(CH3)-CH2-C(O)O—(CH2)3-Si(OC2H5)3
and
C2H5-O—CH2-N(CH2C6H5)-(CH2)3-Si(OC2H5)3
all formed by the reaction of the appropriate secondary aminoalkylsilane with paraformaldehyde in the presence of ethanol as solvent and reagent.

The group R$^1$ in the hydrolysable silanes of the formula

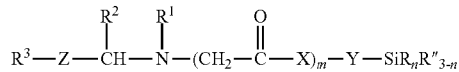

can alternatively represent a group of the formula —Y*—SiR$_q$R"$_{3-q}$ wherein Y* represents a divalent organic spacer linkage having 1 to 20 carbon atoms; each R represents a hydrolysable group; each R" represents a hydrocarbyl group having 1 to 8 carbon atoms; and q=1 to 3. The linkage Y* can be the same as or different to Y, and q can be the same as or different from n. Usually the group —Y*—SiR$_q$R"$_{3-q}$ is the same as the group —Y—SiR$_n$R"$_{3-n}$, that is the secondary aminoalkylsilane which is reacted with an aldehyde and an alcohol or thiol has the formula HN(—Y—SiR$_n$R"$_{3-n}$)$_2$. The secondary aminoalkylsilane can for example be HN(CH$_2$)$_3$—Si(OC$_2$H$_5$)$_3$)$_2$. The hydrolysable silane formed from such a secondary aminoalkylsilane with formaldehyde and an alcohol has the formula R$^3$—O—CH$_2$—N(—Y—SiR$_n$R"$_{3-n}$)$_2$.

Such a hydrolysable silane has the advantage of a large number of hydrolysable groups R for bonding to a filler such as silica. The hydrolysable silane of the invention can for example be C$_2$H$_5$—O—CH$_2$—N[(CH$_2$)$_3$—Si(OC$_2$H$_5$)$_3$]-(CH$_2$)$_3$—Si(OC$_2$H$_5$)$_3$ The secondary aminoalkylsilane can alternatively be a bis (secondary aminoalkylsilane) for example of the formula R$_n$R"$_{3-n}$Si—Y—(X—C(O)—CH2)$_m$—NH—(CH$_2$)$_d$—NH—(CH$_2$—C(O)—X")$_{m''}$—Y—SiR$_r$R"$_{3-r}$ where R, R", n, Y, X and m are defined as above and d=1 to 8; R$^8$ represents hydrogen or a hydrocarbyl or substituted hydrocarbyl group having 1 to 8 carbon atoms; Z represents an oxygen or sulphur atom; R$^9$ represents a hydrocarbyl or substituted hydrocarbyl group having 1 to 20 carbon atoms; X" represents —O— or —NH—; m"=0 or 1; Y represents a divalent organic spacer linkage having 1 to 20 carbon atoms; each R represents a hydrolysable group; each R" represents a hydrocarbyl group having 1 to 8 carbon atoms; and r=1 to 3. Reaction of such a secondary aminoalkylsilane with an aldehyde of the formula R$^2$—CHO and an alcohol of the formula R$^3$OH forms a hydrolysable silane of the invention having the formula

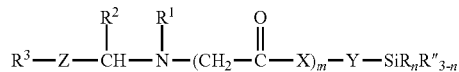

in which $R^1$ represents a group of the formula

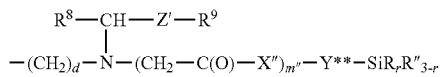

The secondary aminoalkylsilane can for example be of the formula $(C_2H_5O)_3Si—(CH_2)_3—NH—(CH_2)_d—NH—(CH_2)_3—Si(OC_2H_5)_3$ forming a hydrolysable silane of the invention having the formula

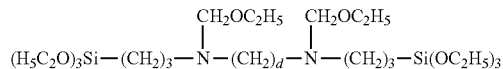

by reaction with formaldehyde and ethanol.

The group $R^1$ in the hydrolysable silanes of the formula

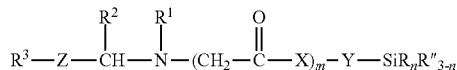

can alternatively be a carboxyalkyl ester group of the formula $—(CH_2)_e—C(O)OR^{10}$ wherein e=1 to 8; and $R^{10}$ represents a hydrocarbyl group having 1 to 8 carbon atoms, for example an ethyl carboxymethyl group or a methyl 3-carboxypropyl group. The secondary aminoalkylsilane can for example be of the formula $C_2H_5—C(O)O—CH_2—NH—(CH_2)_3—Si(OC_2H_5)_3$ forming a hydrolysable silane of the invention having the formula

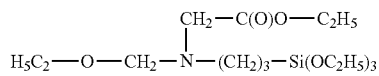

by reaction with formaldehyde and ethanol.

The alcohol of the formula $R^3OH$ which is reacted with a secondary aminoalkylsilane and an aldehyde can alternatively be of the formula $HO—((CH_2)_aO)_b—R^4$ wherein a=1 to 3; b=1 to 6; and $R^4$ represents hydrogen or a hydrocarbyl or substituted hydrocarbyl group having 1 to 20 carbon atoms. In this case the alcohol $R^3OH$ is a diol such as ethylene glycol or propylene glycol, a polyoxyalkylene glycol such as polyoxyethylene glycol or polyoxypropylene glycol, an etheralcohol such as ethoxyethanol or methoxyethanol or a polyoxyalkylene glycol monoether such as ethoxyethoxyethanol.

When the alcohol $R^3OH$ is an etheralcohol or a polyoxyalkylene glycol monoether, reaction with a secondary aminoalkylsilane of the formula $R^1—NH—(CH_2—C—X)_m—Y—SiR_nR''_{3-n}$ and an aldehyde of the formula $R^2—CHO$ forms a hydrolysable silane of the formula

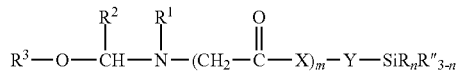

wherein $R^3$ represents an alkoxyalkyl group or poly(alkoxy) alkyl group. An example of such a hydrolysable silane is $C_2H_5—O—CH_2CH_2—O—CH_2—N(CH_3)—(CH_2)_3—Si(OC_2H_5)_3$ formed by reaction of ethoxyethanol with N-methyl-3-(triethoxysilyl)propylamine and formaldehyde.

When the alcohol $R^3OH$ is a diol or a polyoxyalkylene glycol, reaction with a secondary aminoalkylsilane and an aldehyde can also form a bis(silylalkylaminoalkyl)ether by reaction of both alcohol groups of the diol or polyoxyalkylene glycol, if the diol or polyoxyalkylene glycol is used in stoichiometric excess. Reaction of a diol or polyoxyalkylene glycol of the formula $HO—((CH_2)_aO)_b—R^4$, wherein a=1 to 3; b=1 to 6; and $R^4$ represents hydrogen, with a secondary aminoalkylsilane of the formula $R^1—N—(CH_2—C—X)_m—Y—SiR_nR''_{3-n}$ and an aldehyde of the formula $R^2—CHO$ can form a bis(silylalkylaminoalkyl)ether of the formula

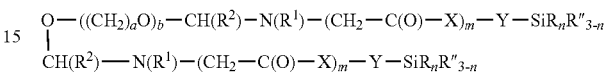

An example of such a bis(silylalkylaminoalkyl)ether is $(C_2H_5O)_3Si—(CH_2)_3—N(CH_3)—CH_2—O—CH_2CH_2—O—CH_2—N(CH_3)—(CH_2)_3—Si(OC_2H_5)_3$ formed by the reaction of ethylene glycol with N-methyl-3-(triethoxysilyl)propylamine and formaldehyde.

The reaction product of the diol or polyoxyalkylene glycol with the secondary aminoalkylsilane of the formula $R^1—N—(CH_2—C—X)_m—Y—SiR_nR''_{3-n}$ and the aldehyde of the formula $R^2—CHO$ may be a mixture of a bis(silylalkylaminoalkyl)ether of the formula

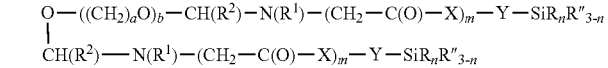

and a hydrolysable silane of the formula

wherein $R^3$ represents a hydroxyalkyl group or poly(alkoxy) alkyl group of the formula $—((CH_2)_aO)_b—H$.

When Z is sulphur, that is when the reagent $R^3ZH$ is a thiol, the thiol is preferably not a simple alkylthiol since a malodorous alkylthiol may then be liberated during reaction with the C=C bonds present in carbon based fillers upon heating to the temperatures used in polymer compounding. The group $R^3$ in a thiol $R^3SH$ preferably contains an anchoring group whereby any thiol liberated will remain chemically bound in the elastomer composition. Most preferably the group $R^3$ contains a hydrolysable silane group, since hydrolysable silane groups are capable of bonding to siloxane polymers and hydroxy-functional polymers through hydrolysis of the silane group. $R^3$ can for example be a group of the formula $—Y''—SiR_pR''_{3-p}$ wherein Y'' represents a divalent organic spacer linkage having 1 to 20 carbon atoms; each R represents a hydrolysable group; each R'' represents a hydrocarbyl group having 1 to 8 carbon atoms; and p=1 to 3. The thiol can for example be $HS—(CH_2)_3—Si(OC_2H_5)_3$.

The thiol of the formula $HS—Y''—SiR_pR''_{3-p}$ can be reacted with a secondary aminoalkylsilane of the formula $R^1—NH—(CH_2—C—X)_m—Y—SiR_nR''_{3-n}$ and an aldehyde of the formula $R^2—CHO$ to form a hydrolysable silane of the formula

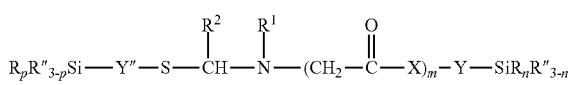

Examples of such hydrolysable silanes include

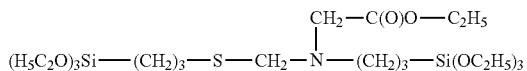

formed by the reaction of HS—(CH$_2$)$_3$—Si(OC$_2$H$_5$)$_3$ with C$_2$H$_5$—C(O)O—CH$_2$—NH—(CH$_2$)$_3$—Si(OC$_2$H$_5$)$_3$ and formaldehyde; (C$_2$H$_5$O)$_3$Si—(CH$_2$)$_3$—S—CH$_2$—N(CH$_3$)—CH$_2$C(O)O—(CH$_2$)$_3$—Si(OC$_2$H$_5$)$_3$ formed by the reaction of HS—(CH$_2$)$_3$—Si(OC$_2$H$_5$)$_3$ with CH$_3$—NH—CH$_2$—C(O)O—(CH$_2$)$_3$—Si(OC$_2$H$_5$)$_3$ and formaldehyde;

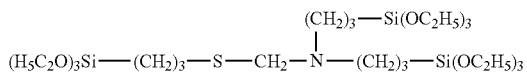

formed by the reaction of HS—(CH$_2$)$_3$—Si(OC$_2$H$_5$)$_3$ with HN(CH$_2$)$_3$—Si(OC$_2$H$_5$)$_3$)$_2$ and formaldehyde; and (C$_2$H$_5$O)$_3$Si—(CH$_2$)$_3$—S—CH$_2$—N(CH$_3$)—(CH$_2$)$_3$—Si(OC$_2$H$_5$)$_3$ formed by the reaction of HS—(CH$_2$)$_3$—Si(OC$_2$H$_5$)$_3$ with CH$_3$—NH—(CH$_2$)$_3$—Si(OC$_2$H$_5$)$_3$ and formaldehyde.

The unsaturated silane can be partially hydrolysed and condensed into oligomers containing siloxane linkages. For most end uses it is preferred that such oligomers still contain at least one hydrolysable group bonded to Si per unsaturated silane monomer unit to enhance coupling of the carbon based filler with siloxane polymers and hydroxy-functional polymers.

The carbon based filler which is treated with the hydrolysable silane of the formula

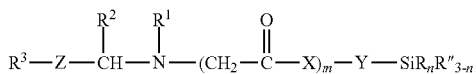

as defined above can for example be carbon fibre, carbon black, carbon nanotubes, fullerene, graphene, expandable graphene and expandable graphite.

The hydrolysable silane is generally contacted with the carbon based filler when in a liquid form. The carbon based filler is preferably treated with the hydrolysable silane at a temperature in the range 110° C. to 190° C. Most of the hydrolysable silanes of the formula

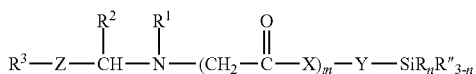

as defined above are liquid at the preferred temperature of treatment. These liquid hydrolysable silanes can be applied undiluted or in the form of a solution or emulsion. A hydrolysable silane which is solid at the temperature of treatment is applied in the form of a solution or emulsion.

Thus in one process according to the invention a polymeric material, the carbon-based filler and the hydrolysable silane are heated together preferably at a temperature of 120 to 200° C., whereby the polymeric material is crosslinked. Such in-situ process permits to form in one step the composite material containing the modified filler and the polymer matrix.

Various types of equipment can be used to treat the carbon based filler with the hydrolysable silane. Suitable types will depend on the form of the carbon based filler. For a particulate filler such as carbon black, a mixer can be used such as a Banbury mixer, a Brabender Plastograph (Trade Mark) 350S mixer, a pin mixer, a paddle mixer such as a twin counter-rotating paddle mixer, a Glatt granulator, a Lödige equipment for filler treatment, a ploughshare mixer or an intensive mixer including a high shear mixing arm within a rotating cylindrical vessel. A fibrous filler such as carbon fibre can be treated in tow, yarn, tyre cord, cut fibre or fabric form using an appropriate process known in the textile industry, for example a tow, yarn or fabric can be treated by spraying, gravure coating, bar coating, roller coating such as lick roller, 2-roll mill, dip coating or knife-over-roller coating, knife-over-air coating, padding or screen-printing.

The carbon based filler modified by treatment with the hydrolysable silane can be used in various polymer compositions. This filler treatment creates a coupling agent between the filler and the polymer matrix containing a vinyl group. Examples of thermoplastic resins include organic polymers such as hydrocarbon polymers like for example polyethylene or polypropylene, fluorohydrocarbon polymers like Teflon, silane modified hydrocarbon polymers, maleic anhydride modified hydrocarbon polymers, vinyl polymers, acrylic polymers, polyesters, polyamides and polyurethanes.

When producing a filled thermoset resin composition, the modified carbon based filler is generally compounded with the thermosetting resin before the resin is cured. Examples of thermosetting resins include epoxy resins, polyurethanes, amino-formaldehyde resins and phenolic resins. Thermosetting resins may include aminosilane as curing agent.

The modified carbon filler can also be used in silicone polymers or in polymers containing silyl groups. For example it can be used in silicone elastomers, silicone rubbers, resins, sealants, adhesives, coatings, vinyl functionalised PDMS (with terminal and/or pendant Si-vinyl groups), silanol functional PDMS (with terminal and/or pendant silanol groups), and silyl-alkoxy functional PDMS (with terminal and/or pendant silyl groups). A wide range of applications of such silicone based materials exist for example in electronics, for managing thermal and electrical properties like for example conductivity. It can further be used in silicone-organic copolymers like for example silicone polyethers or in silyl-modified organic polymers with terminated or pendant silyl group. This includes any type of silyl terminated polymers like polyether, polyurethane, acrylate, polyisobutylene, grafted polyolefin etc. For example a silicone elastomer can contain modified carbon nanotubes to form a composite coating on metal having improved thermal properties.

The modified carbon based filler can be dispersed in an elastomer like a diene elastomer i.e. a polymer having elastic properties at room temperature, mixing temperature or at the usage temperature, which can be polymerized from a diene monomer. Typically, a diene elastomer is a polymer containing at least one ene (carbon-carbon double bond, C═C) having a hydrogen atom on the alpha carbon next to the C═C bond. The diene elastomer can be a natural polymer such as natural rubber or can be a synthetic polymer derived at least in part from a diene. The diene elastomer can for example be:
(a) any homopolymer obtained by polymerization of a conjugated diene monomer having 4 to 12 carbon atoms;

(b) any copolymer obtained by copolymerization of one or more dienes conjugated together or with one or more vinyl aromatic compounds having 8 to 20 carbon atoms;
(c) a ternary copolymer obtained by copolymerization of ethylene, of an [alpha]-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

For example a filled polymer composition comprising a thermoplastic resin, a thermoset resin or an elastomer shows improved adhesion and/or coupling of the carbon based filler to the polymeric material if the carbon based filler is modified by treatment with the hydrolysable silane. This can ensure creation of an intimate network between the carbon based filler and the polymer matrix wherein the filler is dispersed. A better coupling between the filler and the polymer matrix gives better reinforcing properties and can also give better thermal and electrical conductivity.

For example a filled polymer composition comprising an organosilicon polymer and the modified carbon based filler has the advantage that the hydrolysable silane acts as a compatibilising agent between the filler and an organosilicon polymer matrix. The organosilicon polymer can be an organopolysiloxane such as a polydiorganosiloxane. Polydiorganosiloxanes, such as polydimethylsiloxane, often have a terminal Si-bonded OH group or Si-bonded alkoxy group, and the hydrolysable silane of the invention bonds particularly strongly to such organosilicon polymers. The hydrolysable silane thus acts as a coupling agent for the carbon based filler and the organosilicon polymer, forming filled polymer compositions of improved physical properties. Examples of the physical properties that can be improved include thermal conductivity & thus heat dissipation, flame retardancy, mechanical properties such as tensile strength obtained by reinforcement, reduction of crack failure at the polymer/filler interface, electrical conductivity and thermal stability. For example the improved electrical conductivity is of advantage in polymer compositions used in electronic devices and solar cells.

Similar advantages are obtained when the carbon based filler modified by treatment with the hydrolysable silane is incorporated in polymer compositions comprising a polymer grafted with an alkoxysilane, for example polyethylene grafted with a vinylalkoxysilane or polypropylene grafted with an acryloxysilane or sorbyloxysilane or polyamide. An example of an application in which the improved thermal stability is of great advantage is in the production of hoses from grafted polypropylene, where a higher heat deflection temperature is achieved. Polymer compositions modified by silanes are for example described in WO2010000477, WO2010000478 and WO2010000479.

Similar advantages are obtained when the carbon based filler modified by treatment with the hydrolysable silane is incorporated in rubber compositions modified by a silane for example SBR (styrene butadiene rubber), BR (polybutadiene rubber), NR (natural rubber), IIR (butyl rubber). Rubbers modified by silanes are described for example in WO2010125124 and WO 2010125123.

Another type of polymer composition in which the carbon based filler modified by treatment with the hydrolysable silane can be used is a composition comprising an organic polymer and a crosslinking agent containing organosilicon groups. An example of such a composition is an epoxy resin composition containing an amino-functional alkoxysilane crosslinking agent. The hydrolysable silane thus acts as a coupling agent between the carbon based filler and the amino-functional alkoxysilane, and as the amino-functional alkoxysilane crosslinks the epoxy resin the hydrolysable silane thus acts as a coupling agent between the carbon based filler and the epoxy resin matrix, forming filled epoxy compositions of improved physical properties.

The carbon based fillers modified by treatment with the hydrolysable silane can also be used to achieve filled polymer compositions having equal physical properties at lighter weight. Carbon based fillers are generally 30% lighter than the silica fillers used in organosilicon polymer compositions, and graphene or carbon nanotubes also give the same reinforcement at lower volume fraction. Similarly carbon fibres modified by treatment with the hydrolysable silane can form lighter weight compositions having equal physical properties if replacing glass fibres.

The hydrolysable silane also improves the compatibility and adhesion between a carbon based filler such as carbon black and another filler like glass fibre filler, bio-filler like starch, cellulose including cellulose nanowhiskers, hemp, wood, talc etc when carbon based filler modified by treatment with the hydrolysable silane and another filler are used together in a filled polymer composition. The physical properties of the composition, for example a composition for forming wind turbine blades, are thereby improved.

The carbon based filler modified by treatment with the hydrolysable silane can be used in conjunction with other fillers in a filled polymer composition. Such other fillers can be any other type of filler or fibres, synthetic or natural, and for example include glass fibres, wood fibres or silica, or bio-fillers like starch, cellulose fibre including cellulose nanowhiskers, hemp, talc, polyester, polypropylene, polyamide etc. The mixture of fillers can be used in a thermoplastic resin, a thermoset resin or an elastomer as described above. A mixture of carbon based filler modified by treatment with hydrolysable silane and a glass fibre filler can for example be used in a filled polymer composition for forming wind turbine blades. The invention provides a process for modifying the surface of a carbon based filler by treatment with a hydrolysable silane, characterised in that the hydrolysable silane is a silane of the formula

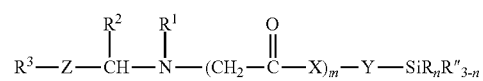

wherein each R represents a hydrolysable group; each R" represents a hydrocarbyl group having 1 to 8 carbon atoms; n=1 to 3; Y represents a divalent organic spacer linkage having 1 to 20 carbon atoms; X represents —O— or —NH—; m=0 or 1; $R^2$ represents hydrogen or a hydrocarbyl or substituted hydrocarbyl group having 1 to 8 carbon atoms; Z represents an oxygen or sulphur atom; $R^3$ represents a hydrocarbyl or substituted hydrocarbyl group having 1 to 20 carbon atoms; and $R^1$ represents a hydrocarbyl or substituted hydrocarbyl group having 1 to 20 carbon atoms. Preferably $R^1$ represents a hydrocarbyl or substituted hydrocarbyl group having 1 to 20 carbon atoms other than a group of the formula $R^3$—Z—CH($R^2$)— as defined above.

The invention provides a process characterised in that Z represents an oxygen atom and R3 represents a hydrocarbyl group having 1 to 8 carbon atoms.

The invention provides a process characterised in that Z represents an oxygen atom and R3 represents a group of the formula —((CH2)aO)b-R4 wherein a=1 to 3; b=1 to 6; and R4 represents hydrogen or a hydrocarbyl or substituted hydrocarbyl group having 1 to 20 carbon atoms.

The invention provides a process characterised in that Z represents a sulphur atom and R3 represents a group of the formula —Y"—SiRpR"3-p wherein Y" represents a divalent organic spacer linkage having 1 to 20 carbon atoms; each R represents a hydrolysable group; each R" represents a hydrocarbyl group having 1 to 8 carbon atoms; and p=1 to 3.

The invention provides a process characterised in that R1 represents a hydrocarbyl group having 1 to 8 carbon atoms.

The invention provides a process characterised in that R1 represents a group of the formula —Y*—SiRqR"3-q wherein Y* represents a divalent organic spacer linkage having 1 to 20 carbon atoms; each R represents a hydrolysable group; each R" represents a hydrocarbyl group having 1 to 8 carbon atoms; and q=1 to 3.

The invention provides a process characterised in that R1 represents a group of the formula

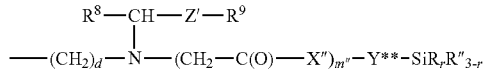

wherein d=1 to 8; $R^8$ represents hydrogen or a hydrocarbyl or substituted hydrocarbyl group having 1 to 8 carbon atoms; Z represents an oxygen or sulphur atom; $R^9$ represents a hydrocarbyl or substituted hydrocarbyl group having 1 to 20 carbon atoms; X" represents —O— or —NH—; m"=0 or 1; Y** represents a divalent organic spacer linkage having 1 to 20 carbon atoms; each R represents a hydrolysable group; each R" represents a hydrocarbyl group having 1 to 8 carbon atoms; and r=1 to 3.

The invention provides a process characterised in that R1 represents a group of the formula —(CH2) e-C(O)OR10 wherein e=1 to 8; and R10 represents a hydrocarbyl group having 1 to 8 carbon atoms.

The invention provides a process characterised in that R2 represents hydrogen.

The invention provides a process characterised in that each group R is an alkoxy group having 1 to 4 carbon atoms.

The invention provides a process characterised in that each group R is an ethoxy group.

The invention provides a process characterised in that a=3.

The invention provides a process wherein the carbon based filler comprises carbon fibres and/or carbon black.

The carbon based filler is preferably selected from carbon nanotubes, fullerene, graphene and expandable graphene.

The invention provides a process wherein a polymeric material, the carbon-based filler and the hydrolysable silane are heated together preferably at a temperature of 120 to 200° C., whereby the polymeric material is crosslinked.

The invention provides a carbon based filler modified by treatment with a hydrolysable silane of the formula

as defined above.

The invention provides a filled polymer composition comprising an organosilicon polymer and a modified carbon based filler as defined above.

The invention provides a filled polymer composition comprising an organic polymer, a crosslinking agent containing organosilicon groups and a modified carbon based filler as defined above.

The invention provides a filled polymer composition comprising a polymer matrix, a modified carbon based filler as defined above, and any other type of filler or fibre.

The invention provides the use of a hydrolysable silane of the formula

wherein each R represents a hydrolysable group; each R" represents a hydrocarbyl group having 1 to 8 carbon atoms; n=1 to 3; Y represents a divalent organic spacer linkage having 1 to 20 carbon atoms; X represents —O— or —NH—; m=0 or 1; $R^2$ represents hydrogen or a hydrocarbyl or substituted hydrocarbyl group having 1 to 8 carbon atoms; Z represents an oxygen or sulphur atom; $R^3$ represents a hydrocarbyl or substituted hydrocarbyl group having 1 to 20 carbon atoms; and $R^1$ represents a hydrocarbyl or substituted hydrocarbyl group having 1 to 20 carbon atoms other than a group of the formula $R^3$—Z—CH($R^2$)— as defined above, to modify the surface of a carbon based filler to introduce a reactive function on the surface of the filler.

Silane Synthesis

Silane 1

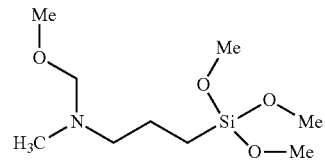

Detailed synthesis of N-(ethoxymethyl)-N-(methyl)-3-aminopropyltrimethoxysilane. A 250 mL two necked round-bottom flask, fitted with a condenser, nitrogen sweep and magnetic stirrer was charged with 44.03 g of N-methyl-3-aminopropyltrimethoxysilane, 6.84 g paraformaldehyde and 36.89 g of ethanol. The suspension was vigorously stirred and heated to 80° C. under nitrogen inert atmosphere. Ethanol reflux was maintained for less than 1 hour, until complete disappearance of solid particles in the reaction mixture before ethanol was removed in vacuo. Formation of the ethoxymethylamine structure was confirmed by nuclear magnetic resonance.

Silane 2

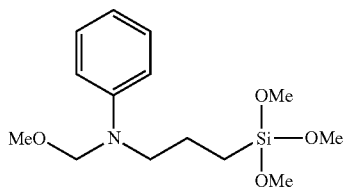 [SMILES: COCN(CCC[Si](OC)(OC)OC)c1ccccc1]

Detailed synthesis of N-(methoxymethyl)-N-phenyl-N-(3-trimethoxysilylpropyl)amine. A 250 ml two necked round bottom flask, fitted with a condenser, nitrogen sweep and magnetic stirrer, was charged with 44.1 g of N-phenyl-N-(3-trimethoxysilylpropyl)amine, 5.2 g paraformaldehyde and 35 ml methanol. The suspension was heated to 65° C. while stirring under nitrogen atmosphere. Methanol reflux was maintained for less than 1 hour, until complete disappearance of solid particles in the reaction mixture before methanol was removed in vacuo. Both formation of the methoxymethylamine structure and preservation of the trimethoxysilane fragment were confirmed by nuclear magnetic resonance.

Silane 3

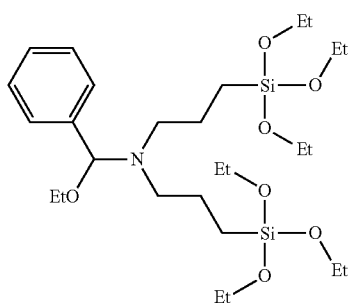 [SMILES: CCOC(c1ccccc1)N(CCC[Si](OCC)(OCC)OCC)CCC[Si](OCC)(OCC)OCC]

Detailed synthesis of N-(methoxymethyl)-N-phenyl-N-(3-trimethoxysilylpropyl)amine. A 250 ml two necked round bottom flask, fitted with a condenser, nitrogen sweep and magnetic stirrer, was charged with 39.03 g of bis-(triethoxysilylpropyl)-amine, 9.73 g benzaldehyde and 21.33 g ethanol. The suspension was heated to 65° C. while stirring under nitrogen atmosphere. Ethanol reflux was maintained for less than 1 hour, until complete disappearance of solid particles in the reaction mixture before methanol was removed in vacuo. Both formation of the Ethoxymethylamine structure and preservation of the triethoxysilane fragment were confirmed by nuclear magnetic resonance.

Silane 4

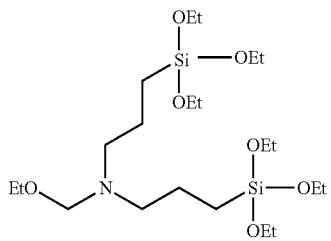

Detailed synthesis of N-(ethoxymethyl)-N,N-bis(3-triethoxysilylpropyl)amine. A 1 L two necked round bottom flask, fitted with a condenser, nitrogen sweep and magnetic stirrer, was charged with 343.1 g of N,N-bis(3-triethoxysilylpropyl)amine, 24.2 g paraformaldehyde and 200 mL ethanol. The suspension was heated to 80° C. while stirring under nitrogen atmosphere. Ethanol reflux was maintained for less than 5 min, until complete disappearance of solid particles in the reaction mixture before ethanol was removed in vacuo. Final product was isolated with 99+% purity and 95% yield. Both formation of the ethoxymethylamine structure and preservation of the triethoxysilane fragment were confirmed by nuclear magnetic resonance.

EXAMPLES 1 TO 4

In example 1 to 4 and comparative example 1 to 4 the following material were used:
Silane 1—N-methoxymethyl-N-methyl aminopropyltrimethoxysilane
Silane 2—N-methoxymethyl-N-phenyl aminopropyltrimethoxysilane
Silane 3—N-α-ethoxybenzyl amino-bis(propyltriethoxysilane)
Silane 4—N,N-bis(triethoxysilylpropryl)-N-1-(ethoxybenzyl) amine
Silane 5—N-methyl-aminopropyltrimethoxysilane
p-H2CO—para-formaldehyde from Sigma Aldrich
CNT—Multiwall carbon nanotube from Nanocyl company—Nanocyl™ NC 7000

All examples were made using the following treatment procedure. To allow good deposition of silane and non silane molecule on the surface of the CNTs, a dispersion in ethanol was prepared—for 1 g of CNT 40 ml of absolute ethanol was used. After dispersion of CNT, silane and if necessary p-H2CO were added. The solution was stirred for 2 hours at room temperature. After stirring, Ethanol was removed using a rotavapor with a temperature of 50° C. under vacuum. Dried CNT with silane and when present p-H2CO deposit on the surface were heated up in a ventilated oven at 210° C. for time of 2 or 6 hours to optimize deposit on the CNT surface. Treated CNT were then washed using ethanol (70 ml of ethanol for 5 g of treated CNT) to wash out non reacted material. Washed and heat treated CNT were then dried using a rotavapor with a temperature of 50° C. under vacuum to remove traces of ethanol. The obtained samples were then analysed by TGA to detect residual material on the surface and to quantify grafted material.

TGA Results:
Instrument: TGA851/SDTA (Mettler-Toledo), Alumina pan 150 ul, nitrogen & air flow (100 ml/min). See method on graphs. A background of an empty Alumina pan was recorded in the same conditions and subtracted to the TGA of each sample (baseline correction).

TGA Procedure:
25° C. for 2 min under N2
Ramp from 25° C. to 650° C. 10° C./min under N2
Cooling to 550° C. under N2
2 min at 550° C. switch to air
Ramp to 1000° C. at 10° C./min under air The quantification of the deposited product was based for silane on the residue at the end of the procedure. This residue corresponded to silica char formation by degradation of the silane in addition of residue from the carbon nanotubes. Corrected weight residue corresponded to the residue measured on the sample on which residue from pure CNT was subtracted to quantify residue from silane only.

Mole of product was determined using the following equation:

Product mol reacted on CNT surface for 100 g of analysed grafted CNT=corrected residue (%)/(60*Functionality)

Where 60 is the silica molecular weight and functionality is the number of Si atom for each silane molecule. Functionality was 1 for mono silane (silane 1 and 2), functionality is 2 for bis-silane (silane 3 and 4)

Example 1 to 4 were made using respectively silane 1 to 4 and CNT

Comparative example C1 was made using silane 5, p-H2CO and CNT

Comparative example C2 was pure CNT reference product

Comparative example C3 was CNT following all treatment procedure to understand impact of treatment procedure on CNT Comparative example C4 was made using silane 5 and CNT without p-H2CO as it is reported in the literature that silane and especially amino silane can graft on the surface of CNT through surface defects.

TABLE 1

| example | Molecule(s) | Quantities of material (g) | Optimal Treatment procedure found (hr/temperature) |
|---|---|---|---|
| 1 | N-methoxymethyl-N-methylaminopropyl-trimethoxysilane | CNT: 8.1 g Silane: 5.3 g | 6 hrs at 210° C. |
| 2 | N-methoxymethyl-N-phenylaminopropyl-triethoxysilane | CNT: 5.0 g Silane: 4.95 g | 6 hrs at 210° C. |
| 3 | N-α-ethoxybenzyl amino-bis(propyltriethoxysilane) | CNT: 5.0 g Silane: 9.37 g | 6 hrs at 210° C. |
| 4 | N,N-bis(triethoxysilylpropryl)-N-1-(ethoxybenzyl) amine | CNT: 5 g Silane: 20.4 g | 6 hrs at 210° C. |
| C2 | N-methyl-aminopropyl-trimethoxysilane + p-H2CO | CNT: 5 g Silane: 2.75 g p-H2CO: 0.43 g | 2 hrs at 210° C. |
| C4 | N-methyl-aminopropyl-trimethoxysilane | CNT: 5 g Silane: 2.8 g | 2 hrs at 210° C. |

TABLE 2

| example | Residue at 1000° C. (weight %) in air | Corrected residue (weight %) | Product mol reacted on CNT surface for 100 g of analysed grafted CNT |
|---|---|---|---|
| 1 | 24.1 | 14.39 | 0.24 |
| 2 | 21.7 | 11.99 | 0.20 |
| 3 | 32.3 | 22.59 | 0.187 |
| 4 | 36.2 | 26.49 | 0.22 |
| C1 | 20.86 | 11.15 | 0.186 |
| C2 | 9.71 | 0 | 0 |
| C3 | 9.06 | — | — |
| C4 | 19.5 | 9.79 | 0.163 |

Compared to comparative example C4 all silane showed higher grafting potential on CNT.

Compared to comparative example C1 example 1, 2 and 3 clearly showed a higher grafting capacity based on results from table above.

Comparative example C1 showed a higher grafting possibility than comparative example C4 linked to the presence of para-formaldehyde that in presence of silane, which release ethanol during treatment phase, likely forms the alkoxy-methyl-amine equivalent to then graft to the CNT structure.

Compared to example 1 the grafting level is significantly lower due to a 2 step grafting process: formation of alkoxy-methyl amine and then reaction with CNT.

Raman spectrum did confirm grafting of the alkoxy-methyl-amine silanes on the C═C from the MWCNT by exhibiting a change in the 2d band. At the time Raman was not able to confirm grafted quantity.

DSC measurement on sample previous to heat treatment did also confirm the presence of a strong exotherm using alkoxy-methyl-amine silanes at a temperature starting at 180° C. DSC also presented a first small endotherm corresponding to the loss of the alkoxy group on the carbon in alpha to the Nitrogen atom.

From DSC measurement it appears that a higher temperature or a longer contact time for some silane will be required like e.g. for silane 4. This contact time or higher temperature will allow a more efficient grafting and reduce silane grafting on the CNT surface without losing any material during the rinsing.

CNT are known to be a good model for any type of carbon filler like e.g. carbon black, long carbon fibres or carbon fibre mats or graphene. Using the previous silane will allow also covalent grafting of silane or siloxane on the surface of Those silanes will be used potentially together with a second silane to allow introduction of a new chemistry on the surface of the carbon filler. Those new functionality will render carbon filler more reactive to any polymeric matrix to allow coupling between matrix and filler to improve mechanical performances. Example of silane will be:

Aminopropyltriethoxysilane, glycydoxy-propyl-trimethoxysilane for epoxy matrixes for printed circuit boards or wind core blade laminates or Maleic anhydride-g-Polypropylene for automotive application, Methacryloxypropyl or bis-(triethoxysilylpropyl)-fumarate for polyester resins for printed circuit boards or wind core blade laminates, Vinyl silane for polyester resins, Bis-(trethoxysilylpropyl)-fumarate or mercaptopriopyltriethoxysilane or bis-(triethoxysilylpropyl)-tetrasulfane or disulfane for diene elastomers and tyre or engineered rubber goods application, Sorbyloxypropyltrimethoxysilane for neat Polypropylene.

Any silane known in the art to graft or react with any type of polymeric matrix can be used.

The invention claimed is:

1. A process for modifying the surface of a carbon based filler by treatment with a hydrolysable silane, characterised in that the hydrolysable silane is a silane of the formula

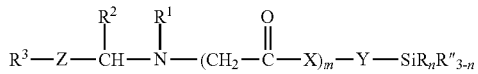

wherein each R represents a hydrolysable group; each R" represents a hydrocarbyl group having 1 to 8 carbon atoms; n=1 to 3; Y represents a divalent organic spacer linkage having 1 to 20 carbon atoms; X represents —O— or —NH—; m=0 or 1; $R^2$ represents hydrogen or a hydrocarbyl or substituted hydrocarbyl group having 1 to 8 carbon atoms; Z represents an oxygen or sulphur atom; $R^3$ represents a hydrocarbyl or substituted hydrocarbyl group having 1 to 20 carbon atoms; and $R^1$ represents a hydrocarbyl or substituted hydrocarbyl group having 1 to 20 carbon atoms.

2. A process according to claim 1, characterised in that Z represents an oxygen atom and R³ represents a hydrocarbyl group having 1 to 8 carbon atoms.

3. A process according to claim 1, characterised in that Z represents an oxygen atom and R³ represents a group of the formula —((CH2)$_a$O)$_b$—R⁴ wherein a=1 to 3; b=1 to 6; and R⁴ represents hydrogen or a hydrocarbyl or substituted hydrocarbyl group having 1 to 20 carbon atoms.

4. A process according to claim 1, characterised in that Z represents a sulphur atom and R³ represents a group of the formula —Y"—SiR$_p$R"$_{3-p}$ wherein Y" represents a divalent organic spacer linkage having 1 to 20 carbon atoms; each R represents a hydrolysable group; each R" represents a hydrocarbyl group having 1 to 8 carbon atoms; and p=1 to 3.

5. A process according to claim 1, characterised in that R¹ represents a hydrocarbyl group having 1 to 8 carbon atoms.

6. A process according to claim 1, characterised in that R¹ represents a group of the formula —Y*—SiR$_q$R"$_{3-q}$ wherein Y* represents a divalent organic spacer linkage having 1 to 20 carbon atoms; each R represents a hydrolysable group; each R" represents a hydrocarbyl group having 1 to 8 carbon atoms; and q=1 to 3.

7. A process according to claim 1, characterised in that R¹ represents a group of the formula

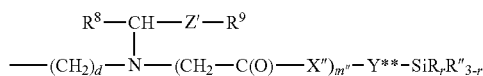

wherein d=1 to 8; R⁸ represents hydrogen or a hydrocarbyl or substituted hydrocarbyl group having 1 to 8 carbon atoms; Z represents an oxygen or sulphur atom; R⁹ represents a hydrocarbyl or substituted hydrocarbyl group having 1 to 20 carbon atoms; X" represents —O— or —NH—; m"=0 or 1; Y** represents a divalent organic spacer linkage having 1 to 20 carbon atoms; each R represents a hydrolysable group; each R" represents a hydrocarbyl group having 1 to 8 carbon atoms; and r=1 to 3.

8. A process according to claim 1, characterised in that R¹ represents a group of the formula —(CH2)$_e$—C(O)OR¹⁰ wherein e=1 to 8; and R¹⁰ represents a hydrocarbyl group having 1 to 8 carbon atoms.

9. A process according to claim 1, characterised in that R² represents hydrogen.

10. A process according to claim 1, characterised in that each group R is an alkoxy group having 1 to 4 carbon atoms.

11. A process according to claim 10, characterised in that each group R is an ethoxy group.

12. A process according to claim 1, characterized in that n=3.

13. A process according to claim 1, wherein the carbon based filler comprises carbon fibres.

14. A process according to claim 1, wherein the carbon based filler is carbon black.

15. A process according to claim 1, wherein the carbon based filler is selected from carbon nanotubes, fullerene, graphene and expandable graphene.

16. A process according to claim 1, wherein a polymeric material, the carbon-based filler and the hydrolysable silane are heated together at a temperature of 120 to 200° C., whereby the polymeric material is crosslinked.

17. A carbon based filler modified by treatment with a hydrolysable silane of the formula

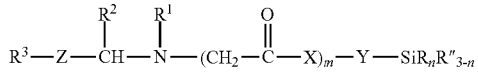

as defined according to claim 1.

18. A filled polymer composition comprising an organosilicon polymer and a modified carbon based filler as defined in claim 17.

19. A filled polymer composition comprising an organic polymer, a crosslinking agent containing organosilicon groups and a modified carbon based filler as defined in claim 17.

20. A filled polymer composition comprising a polymer matrix, a modified carbon based filler as defined in claim 17, and any other type of filler or fibre.

* * * * *